US007022233B2

(12) United States Patent
Chen

(10) Patent No.: US 7,022,233 B2
(45) Date of Patent: Apr. 4, 2006

(54) BIOLOGICALLY ACTIVE REACTOR SYSTEM AND METHOD FOR TREATING WASTEWATER

(75) Inventor: Jeffrey J. Chen, Palo Alto, CA (US)

(73) Assignee: Severn Trent Services, Water Purification Solutions, Inc., Colmar, PA (US)

( * ) Notice: Subject to any disclaimer, the term of this patent is extended or adjusted under 35 U.S.C. 154(b) by 65 days.

(21) Appl. No.: 10/755,073

(22) Filed: Jan. 9, 2004

(65) Prior Publication Data

US 2005/0150829 A1 Jul. 14, 2005

Related U.S. Application Data

(60) Provisional application No. 60/518,445, filed on Nov. 7, 2003, now abandoned.

(51) Int. Cl.
*C02F 3/30* (2006.01)
*C02F 3/06* (2006.01)

(52) U.S. Cl. ............... 210/605; 210/617; 210/622; 210/151; 210/903

(58) Field of Classification Search ........... 210/605, 210/621, 615–618, 622, 150, 151, 903
See application file for complete search history.

(56) References Cited

U.S. PATENT DOCUMENTS

| 2,359,004 | A | * | 9/1944 | Schlenz et al. ............. 210/605 |
|---|---|---|---|---|
| 3,853,752 | A | | 12/1974 | Tymoszezuk |
| 4,179,374 | A | | 12/1979 | Savage et al. |
| 4,479,876 | A | * | 10/1984 | Fuchs ........................ 210/605 |
| 4,915,841 | A | * | 4/1990 | Lagana' et al. ............ 210/605 |
| 4,917,802 | A | * | 4/1990 | Fukaya et al. ............. 210/605 |
| 4,923,606 | A | | 5/1990 | Gresh et al. |
| 5,006,251 | A | | 4/1991 | Takeishi et al. |
| 5,252,214 | A | * | 10/1993 | Lorenz et al. ............. 210/605 |

(Continued)

FOREIGN PATENT DOCUMENTS

KR 398912 B * 10/2003

*Primary Examiner*—Fred G. Prince
(74) *Attorney, Agent, or Firm*—D'Ambrosio & Associates, P.L.L.C.

(57) ABSTRACT

A biologically active reactor system for the treatment of wastewater comprises one or more submerged denitrification reactors having coarse media particles and a fixed biological film comprising biologically anoxic active microorganisms. One or more submerged aerated filters are in fluid communication with the one or more submerged denitrification reactor, the submerged aerated filter comprising coarse media particles and a fixed biological film comprising biologically aerobic microorganisms for oxidation of organic matter. One or more deep bed denitrification filters for removal of suspended solids and denitrification of oxidized nitrogens are in fluid communication with the one or more submerged aerated filters, the deep bed denitrification filter comprising fine media particles of less than 6 mm. Effluent from the submerged aerated filter is recycled to the submerged denitrification reactor for pre-denitrification prior to being piped to the deep bed denitrification filter. During the method, wastewater influent along with treated effluent from the submerged aerated filter is fed to a submerged denitrification reactor.

31 Claims, 1 Drawing Sheet

U.S. PATENT DOCUMENTS

| | | | |
|---|---|---|---|
| 5,348,653 A * | 9/1994 | Rovel | 210/605 |
| 5,520,812 A * | 5/1996 | Ryhiner et al. | 210/614 |
| 5,605,629 A * | 2/1997 | Rogalla | 210/605 |
| 5,798,044 A * | 8/1998 | Strohmeier et al. | 210/605 |
| 5,833,856 A * | 11/1998 | Liu et al. | 210/605 |
| 5,908,555 A * | 6/1999 | Reinsel et al. | 210/610 |
| 5,961,830 A * | 10/1999 | Barnett | 210/603 |
| 5,989,427 A | 11/1999 | Ellard | |
| 6,328,892 B1 * | 12/2001 | Jones | 210/605 |
| 6,531,062 B1 * | 3/2003 | Whitehill | 210/602 |
| 2001/0047960 A1 * | 12/2001 | Sato et al. | 210/616 |
| 2002/0074286 A1 * | 6/2002 | Nasr et al. | 210/605 |
| 2004/0206699 A1 * | 10/2004 | Ho et al. | 210/605 |

* cited by examiner

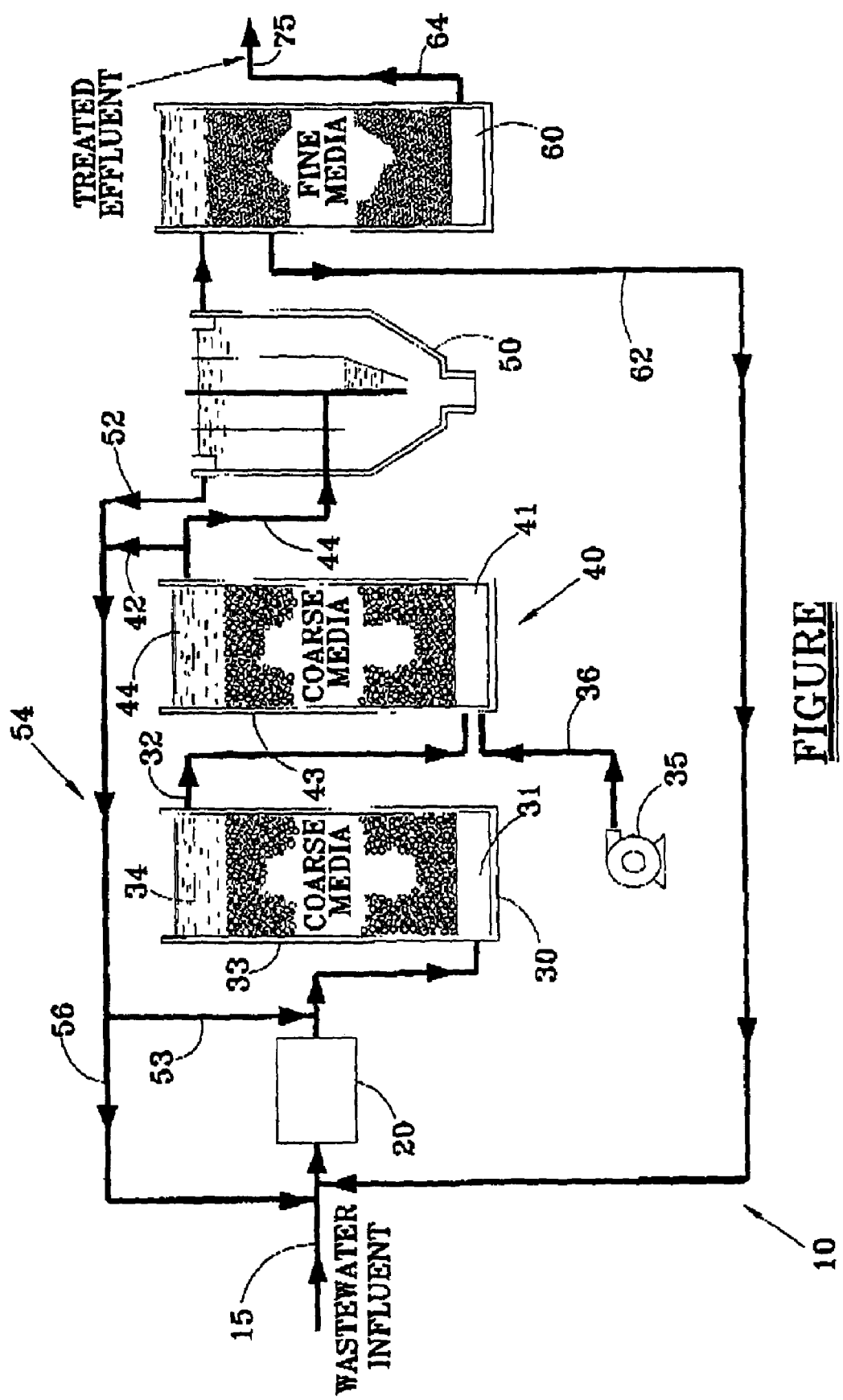

BIOLOGICALLY ACTIVE REACTOR SYSTEM AND METHOD FOR TREATING WASTEWATER

CROSS REFERENCES TO RELATED CASES

This is regular U.S. patent application taking priority from provisional U.S. Patent Application 60/518,445 filed Nov. 7, 2003, now abandoned to continuing data.

FIELD OF THE INVENTION

The present invention relates to a biologically active reactor system and a method for the treatment of wastewater. More particularly, the present invention relates to a system comprising a submerged denitrification reactor, a submerged aerated filter and a deep bed denitrification filter for biological treatment of pollutants in wastewater.

BACKGROUND

The treatment of wastewater and sewage has been developed continuously since medieval times. Since the advent of municipal sewage systems, sewage plants have been built for the treatment of such waste on regional basis. Trickling filters were an early improvement in waste treatment systems. Untreated liquid was spread evenly onto the top of a bed of clinker, coke, broken stone, and other large particles. As the liquid trickled through the bed, oxidation of organic and nitrogenous material in the liquid occurred because of bacteria and other microorganisms which exist on the surfaces of the media of the bed. Solid debris is thus formed which is separated from the liquid in settling tanks. The treatment of sewage wastewater typically requires several stages to remove both solids and soluble and colloidal bio-chemical oxygen demand (BOD). The primary treatment stage is a physical process for removing solids. Wastewater containing raw sewage is passed through a pre-treatment tank where solids settle out by gravity and form a sludge.

A two-step process has been disclosed in several references. Tymoszezuk, U.S. Pat. No. 3,853,752 discloses an improvement in aerobic biological processes for treating waste fluids by combining an activated sludge process with aerated biological filters and non-aerated biological filter beds. These filter beds are similar to presently existing rapid sand filters used for treatment of potable water. Excess sludge is extracted by a sludge concentrator during the first stage.

U.S. Pat. No. 5,006,251 to Takeishi et al., teaches a two-step process for treating organic wastewater. A first step provides the stage precedent to a second step using an aerobic filter bed that employs an upward flow type solid-liquid separator packed with a filter medium. The SS (suspended solids) removal at the preceding stage is performed at a high SS removal rate and in a short time. During the first step, organic wastewater containing SS is introduced into a solid-liquid separator packed with a filter medium having a void ratio of at least 70%, via a lower portion of the separator. The wastewater is discharged from the separator via an upper portion of the separator to remove the suspended solids from the wastewater. A second step introduces the effluent from the first step into an aerobic filter bed packed with a granular filter medium and supplied with oxygen-containing gas from a lower portion of the filter medium-packed bed, via an upper portion of the filter bed. The effluent is discharged from the filter bed via a lower portion of the filter bed to treat the effluent aerobically.

Many attempts have been made to increase the capacity of the filter for a given footprint, that is the area of ground, required by the filter. This is especially important in existing sewage plants which have to increase capacity to meet the demands of a growing population, but cannot increase the area over which the plant extends. The filters have tended to become columns so that a greater filter volume is given by the height of the filter. The upward extent of the filter being limited to the weight, which the base of the filter can support.

As the biological oxidation of the waste occurs on the surfaces of the filtering media, a larger amount of waste can be treated in a given volume of filter by increasing the surface area of the particles in the media. Thus, the average size of the media particles has been reduced in order to increase the surface area of the particles. Furthermore, the particles of the media are often formed from plastics material as this has been found to be particularly advantageous.

It has also been found that the efficiency of the filter is often increased by the filter media being flooded. Flow through the filter may be upwards or downwards. Air is pumped through the flooded filter media bed. It is vital to ensure that the air outlets do not become blocked, otherwise oxidation of the waste would cease. When used with small media (less than about 5 mm nominal diameter) solids are partially retained within the bed of medium and have to be removed by backwashing, requiring costly backwash equipment and downtime for the filter unit. The smaller media and retained particles create higher headloss conditions that may limit treatment capacity. Where solids, are removed by backwashing, the filter is commonly known as a Biological Aerated Filter (BAF). In this case, a settlement tank following the unit is not normally required.

If larger media is used in the filter, solids may not be retained in the bed and are consequently removed by a settlement tank following the filter. In this case where backwashing is not required, the filter is known as either a trickling filter or a Submerged Aerated Filter (SAF). The SAF differs from filter beds (trickling filters) because the media bed is flooded and oxygen is forced into the system from the bottom. U.S. Pat. No. 4,129,374 to Savage, teaches a method and apparatus for the denitrification of wastewater using a facultative zone. The '374 patent involves a wastewater treatment facility that comprises a facultative zone combined with a columnar oxidation unit. In a facultative zone, BOD is solubilized and rendered non-filterable due to low dissolved oxygen conditions thereby impeding the removal of BOD and suspended solids by filtration.

SUMMARY

The biologically active reactor system for the treatment of wastewater of the present invention comprises one or more submerged denitrification reactors in fluid communication with one or more submerged aerated filters and one or more deep bed denitrification filters in fluid communication with the submerged aerated filter. The present invention provides a submerged denitrification reactor and a submerged aerated filter that use coarse media compared to the fine media used in conventional biological filters. Prior deep bed denitrification filters have required the addition of methanol to meet NOx requirements. Recycling the effluent coming from the submerged aerated filter to the submerged denitrification reactor makes use of the BOD in the effluent for pre-denitrification. No additional methanol is required in the deep bed denitrification stage.

Other advantages of the present invention are: the elimination of backwashing requirements and it's associated capital cost savings, and the ease of operation and maintenance without interruption of operation by backwashing.

The present invention uses a course media fixed-film bioreactor to replace both the facultative zone (a suspended-growth reactor or a deep bed fine media columnar facultative reactor) and the fine media columnar oxidation unit of previous systems.

Avoiding the use of fine media in the submerged filters and reactors eliminates the high head loss, air and water distribution problems, and potential plugging typically associated with biological aerated filters. The submerged denitrification reactor and submerged aerated filter of this invention require less instrumentation and fewer valves than typical filters because 1) no backwashing is required and 2) there is no differential head loss between the filter reactors to complicate distribution of influent wastewater and process air. Backwashing disturbs the fixed microbial film that develops in the biological media bed. By eliminating the backwash process, the filtration treatment process continues to operate without being interrupted.

The biologically active reactor system for the treatment of wastewater of the present invention comprises one or more submerged denitrification reactors, the submerged denitrification reactors preferably comprise upright walls defining at least one compartment and a floor. In one aspect, the compartment comprises a media bed, the media bed comprising coarse, mineral media particles and a fixed biological film having biologically anoxic active microorganisms. One or more submerged aerated filters comprise biologically aerobic microorganisms for oxidation of organic matter. Preferably, the one or more deep bed denitrification filters are used for the removal of suspended solids and denitrification of oxidized nitrogens.

The preferred media beds of both the submerged denitrification reactor and the submerged aerated filter comprise media particles ranging in size from about 6 mm to 45 mm in diameter. In contrast, the media bed of the deep bed denitrification unit comprises fine media particles, preferably less than 6 mm. One or more clarification units are preferably positioned between the submerged aeration filter and the deep bed denitrification filter to reduce suspended solids in the wastewater effluent from the submerged aerated filter to the deep bed denitrification filter.

Another aspect of this invention is the method for submerged denitrification filtration. During the method, wastewater influent is fed to a submerged denitrification reactor. The wastewater influent can be pre-treated in a pretreatment unit prior to being piped to the submerged denitrification reactor. The reactor preferably comprises one or more upright walls defining at least one compartment and a floor, the compartment comprising coarse, mineral media particles and a fixed biological film comprising biologically anoxic active microorganisms. The effluent wastewater stream from the submerged denitrification reactor unit is then piped to a submerged aerated filter. After treatment in the submerged aerated filter, the effluent is piped from the submerged aerated filter to a deep bed denitrification filter for removal of suspended solids and denitrification.

The preferred method can further comprise the step of piping the effluent from the submerged aerated filter to a clarification unit prior to sending the effluent to the deep bed denitrification filter to reduce suspended solids within the effluent. The treated effluents can be recycled to the previous stage to improve quality of the final effluent leaving the system.

In one preferred system and method of the present invention, the submerged aerated filter comprises aerobic microorganisms to oxidize organic matter comprising carbonaceous organics, organic and ammonium nitrogens to produce $NO_x$, $CO_2$ and $H_2O$.

In this preferred system and method, the submerged denitrification reactor utilizes BOD within the wastewater influent as an organic carbon source for anoxic microorganisms to denitrify the $NO_x$.

BRIEF DESCRIPTION OF DRAWING

FIGURE: illustrates a biologically active reactor system according to the present invention.

DETAILED DESCRIPTION OF DRAWING

Broadly, this invention relates to a biologically active reactor system 10 and a method for treating wastewater flowing through the reactor 10. The preferred embodiment of the system as shown in the FIGURE comprises a submerged denitrification reactor (hereinafter SDR) 30 in fluid communication with a submerged aerated filter (hereinafter SAF) 40 that is in fluid communication with a deep bed denitrification filter 60. Wastewater influent passes successively through each unit for treatment.

The incoming wastewater 15, with or without pretreatment steps, is piped to an anoxic SDR 30. The SDR 30 is an anoxic course media fixed-film biological reactor 30, that uses coarse media having a biological film. The BOD in the incoming wastewater is utilized by the anoxic microorganisms in the SDR 30 as the organic carbon source. Effluent from the SDR 30 is piped to an oxidation unit, preferably a submerged aerated filter, (SAF). Nitrification and simultaneous BOD oxidation of wastewater take place in the up flow SAF 40. Up to 75% of effluent from the SAF 40 is piped through piping 42 back to the SDR 30 in a recycle stream so that the recycled stream is denitrified to reduce the nitrate and nitrite (NOx) content. This pre-denitrification treatment significantly reduces the amount of methanol required for the deep bed denitrification process.

The SDR 30 can be either in up flow or down flow operation mode as dictated by the hydraulic requirement. The effluent from the SDR 30 is piped to the SAF 40 where the aerobic microorganisms oxidize organic matter as indicated by BOD or carbonaceous organics and organic and ammonium nitrogens to produce NOx, $CO_2$, $H_2O$ among other by-products.

The effluent from SAF 40 may or may not need clarification for reducing suspended solids. A part of the clarified effluent is recycled to SDR 30 for denitrification and the rest of the clarified effluent will enter into the fine media deep bed Denite® filter for suspended solids removal and denitrification with supplemental organic carbon addition if required.

A pre-treatment unit 20 receives wastewater influent 15 prior to piping to the submerged denitrification reactor. The influent 15 can be a combination of raw unsettled sewage, combined sewer overflow (CSO) and sanitary sewer overflow (SSO). Preferably, the raw, unsettled wastewater, SSO and CSO are course screened within the pre-treatment unit 20. Course screening utilizes a bar rack with ½ inch openings between the bars or a wire mesh screen with 6.0 mm openings, to prevent accumulation of debris and waste solids too large to be backwashed from the filter. Fine screening is not required. In another embodiment of this process, grit is also removed prior to piping the wastewater 15 to the SDR. Grit removal utilizes a centrifugal separator or aerated grit chamber to prevent inert, granular material from accumulating within the filter.

The one or more submerged denitrification reactors 30 can each comprise upright walls 33 defining at least one compartment 34 and a floor 31, the compartment 34 comprising a media bed. In one aspect, the media bed comprises coarse, media particles ranging in size from about 6 mm to about 45 mm and a fixed biological film comprising biologically anoxic active microorganisms. The submerged denitrification reactor 30 utilizes BOD within the wastewater influent as an organic carbon source for anoxic microorganisms to denitrify the $NO_x$.

One or more submerged aerated filters 40 are in fluid communication with the one or more submerged denitrification reactors 30 through the use of piping between the two units, 30, 40. The submerged aerated filter comprises a media bed having coarse media particles ranging in size from about 6 mm to about 45 mm and a fixed biological film comprising biologically aerobic microorganisms for oxidation of organic matter.

The SAF is an upflow biologically active reactor 40 having upright walls 43 that define at least one compartment 44 and a floor 41. The compartment 44 holds a media bed having media particles ranging in approximate diameter from about 6 mm to 45 mm. Biologically active microorganisms are present within the media bed. Both nitrification and simultaneous BOD oxidation of wastewater occur in this up flow biologically active unit 40. A layer of underdrain blocks is positioned at the bottom of the reactor with one or more air laterals arranged to run underneath them. The air laterals define a plurality of air holes to provide a plurality of upward jet flows of air into the media bed. These jet flows of air create a plurality of upflow zones of rising air bubbles, microorganisms and wastewater fluid within the media bed. The air laterals are connected to an air blower. One or more feed pipes 32 are positioned adjacent the floor of the cell to deliver wastewater treated in the SDR 30 to the SAF 40.

The average diameter of media particles in the SDR 30 and SAF 40 is within a range of about 6 mm to about 45 mm, 7 mm to 14 mm for example. In one preferred embodiment, the average diameter is greater than 11 mm, and in one aspect, greater than 20 mm. Typically, the media particles are uniformly sized throughout the media bed. Uniform sized media provides large, unrestricted void space that ensures low head loss, which is important to the SAF 40 and SDR 30 units of this invention 10. By avoiding the use of fine media, the units 30, 40 reduce the high hydraulic resistance and head loss created by fine media. Air and water distribution problems, and plugging typically associated with biological filters are also minimized. Backwash, which requires expensive equipment, becomes unnecessary in either the SAF 40 or the SDR 30. Therefore, this invention requires less instrumentation (associated with backwash equipment) and fewer valves than typical aerated filters. Although simplified mechanically, the SDR 30 and SAF 40 have a greater handling capacity per unit of the footprint of the filter. The larger media grains can be packed higher resulting in the more compact footprint.

The media particles used in the SDR 30 and SAF 40 can be mineral media particles that are granular or particulate matter comprising gravel, pumice, blast furnace slag or stone, all readily available and economical resources. The biologically active microorganisms can comprise heterotrophic bacteria and autotrophic bacteria that form a biomass attached to the media bed. The biomass oxidizes the BOD and ammonia as well as reducing nitrates. The biologically active material is preferably in the form of a fixed film which is herein defined as microorganisms that grow in a film on a support structure, media, for example.

The walls 33, 43 and floor 31, 41 of the SDR 30 and SAF 40 may be either of steel or concrete construction and either rectangular or circular (or other suitable shapes) depending upon the manufacturer. The filter medium support system, not shown, is an important part of the SAF. As well as supporting the media and growth, the support must distribute evenly the process air and water, i.e. ensure an even application or removal of flow. Many systems use steel plates or concrete sub floors over a plenum chamber, flow to media being via nozzles. The base can be a Tetra 'T' block floor comprising a layer of interlocked, plastic-jacketed concrete underdrain blocks as described in U.S. Pat. No. 4,923,606. Other types of base could also be used. Other systems use a steel mesh, again located over a plenum chamber. Failure of the filter bottom will result in loss of medium and the need to completely remove the filter for repair. Blockage or partial blockage of the filter bottom will result in a reduction of treatment efficiency.

The compartments 34, 44 house the media beds. Because of the coarser media, the depth of the media bed can range from approximately 5 m to approximately 9 m, 8 m for example. The freeboard above the media can comprise a depth of approximately 0.4 m to approximately 2 m. Purification of the wastewater in a SAF occurs primarily as a result of the biological activity rather than filtration. The term "submerged" as used in referring to the submerged denitrification reactor 30 indicates that the media bed is submerged. The term "submerged aerated filter" 40 refers to the media bed submerged within the wastewater and aerated by means of the air laterals.

Process air is often added from a header, which may be located in the medium immediately above the filter bottom or adjacent the SAF. Process air rates have to be sufficient to maintain aerobic conditions but not so high as to cause scouring of the accumulated biofilm.

The SAF unit 40 of the present invention is preferably an up flow system. One method comprises feeding an up flow biological reactor with wastewater influent through feed pipes 32. Although the system can be used either in up flow or down flow modes, up flow, as illustrated in the FIGURE, is preferred. To reduce pumping requirements, the reactors can be sunk into the ground. Process air is added from stainless steel laterals located under the blocks. There are no diffusers, nozzles or other orifices to block and cause problems. Generally, volumetric pollutant loadings on the biologically active reactor systems of this invention are considerably higher than are achievable by conventional biological filters.

In one embodiment of the biologically active reactor system 10, a clarification unit 50 is used to reduce suspended solids. The clarification unit 50 can be positioned between the submerged aerated filter 40 and the deep bed denitrification filter 60. The effluent from SAF 40 may or may not need clarification for reducing suspended solids. After the wastewater is treated within the clarification unit 50, a part of the clarified effluent can be recycled to SDR 30 for denitrification. The remainder of the clarified effluent enters into the fine media deep bed denitrification filter for suspended solids removal and denitrification.

The one or more deep bed denitrification filters 60 are used for removal of suspended solids and denitrification of oxidized nitrogens. The deep bed denitrification filter 60 is in fluid communication with the one or more submerged aerated filters 40 through piping 44, or by means of a clarification unit 50, if clarification is required. The deep bed denitrification filter comprises fine media particles of less than 6 mm. A deep bed filter 60 as used in this process can be supplied by Severn Trent Water Purification, Inc. marketed under the name, TETRA DeepBed™ Filter. The wastewater influent is piped through piping 44 from the submerged aerated filter 40, either directly to the deep bed denitrification filter 60 or through a clarifier 50 to the denitrification filter 60. The wastewater influent typically comprises soluble BOD, insoluble BOD and suspended solids. During the denitrification filtration process, the influent is filtered through filter media which can be comprised of sand and gravel. In one preferred embodiment, the filter media is comprised of a layer of sand, approximately two to six feet in depth. The sand is selected for its size, ranging between approximately, 2.0 mm and 6.0 mm, as well as its specified hardness, spericity, and uniformity coefficient. The sand characters allow for efficient air/water backwash without attrition loss, good solids retention, filtration rate capability and long run times. The sand media is supported by a filter media support system comprising approximately five layers of gravel which, in turn, is supported by underdrain blocks. Alternatively, the filter media can be supported by a filter media support plate, the Savage™ porous plate, for example.

Preferably, the deep bed filter 60 is backwashed and bumped periodically. The term "bumped" refers to a method of degassing biological filters. Degassing a biological filter comprises a series of sequential steps that produce a backwash flow to purge the filter media of gas. Microbes are used to remove BOD and pollutants contained in wastewater. Gas is produced as a result of microbiological activity within the filter media such as respiration and denitrification. Ellard, U.S. Pat. No. 5,989,427, incorporated herein in its entirety, describes a preferred method of degassing biological filters. Preferably, the backwash 300 is an air/water backwash.

Piping from the deep bed denitrification filter 60 back to the pretreatment unit 20 to recycle dirty backwash from the deep bed denitrification filter 60 to the wastewater influent 15 entering the pre-treatment unit. A portion of the effluent from the submerged aerated filter 40 can also be piped to the wastewater influent entering the pre-treatment unit 20 or piped directly back to the submerged denitrification reactor 30 to recycle the oxygenated and nitrated SAF effluent. The effluent from the SAF 40 undergoes pre-denitrification utilizing the BOD in the effluent prior to entering the deep bed Denite® filter 60 thereby reducing the amount of methanol that must be added to the deep bed filter 60. Piping 52 is also present between the one or more clarification units 50 and the one or more submerged denitrification reactors 30 for recycling the clarified effluent to the submerged denitrification reactor 30.

The method for submerged denitrification filtration comprises a pre-denitrification process, an oxidation/nitrification process and a deep bed denitrification process. During the method, wastewater influent is fed to a submerged denitrification reactor 30. The wastewater influent can be pretreated in a pretreatment unit 20 prior to being piped to the submerged denitrification reactor 30. The reactor preferably comprises one or more upright walls defining at least one compartment and a floor, the compartment comprising coarse, mineral media particles and a fixed biological film comprising biologically anoxic active microorganisms. The effluent wastewater stream from the submerged denitrification reactor 30 is then piped to a submerged aerated filter 40. After treatment in the submerged aerated filter 40, the effluent is piped from the submerged aerated filter 40 to a deep bed denitrification filter 60 for removal of suspended solids and denitrification.

The preferred method can further comprise the step of piping the effluent from the submerged aerated filter 40 to a clarification unit 50 prior to sending the effluent to the deep bed denitrification filter 60 to reduce suspended solids within the effluent. The treated effluents can be recycled to the previous stage to improve quality of the final effluent leaving the system.

In the method of the present invention, the submerged aerated filter 40 comprises aerobic microorganisms to oxidize organic matter comprising carbonaceous organics, organic and ammonium nitrogens to produce $NO_x$, $CO_2$ AND $H_2O$. In this preferred method, the submerged denitrification reactor utilizes BOD within the wastewater influent as an organic carbon source for anoxic microorganisms to denitrify the NOx.

The spent backwash water from the deep bed denitrification filter 60 is piped back to the pretreatment unit 20 to recycle the dirty backwash. A portion of the effluent from the submerged aerated filter can also be piped to the wastewater influent entering the pre-treatment unit or piped directly back to the submerged denitrification reactor to recycle a portion of the wastewater effluent from the submerged aerated filter for pre-denitrification prior to entering the deep bed Denite® filter. Piping 52 is also present between the one or more clarification units 50 and the one or more submerged denitrification reactors 30 for recycling the clarified effluent to the submerged denitrification reactor.

The foregoing description is illustrative and explanatory of preferred embodiments of the invention, and variations in the size, shape, materials and other details will become apparent to those skilled in the art. It is intended that all such variations and modifications which fall within the scope or spirit of the appended claims be embraced thereby.

The invention claimed is:

1. A biologically active reactor system for the treatment of wastewater, the system comprising:
   one or more submerged denitrification reactors, the reactors comprising upright walls defining at least one compartment and a floor, the compartment comprising a media bed, the media bed comprising coarse, uniformly sized mineral media particles and a fixed biological film comprising biologically anoxic active microorganisms;
   one or more submerged aerated filters comprising biologically aerobic microorganisms for oxidation of organic matter in fluid communication with the submerged denitrification reactor;
   the media bed of the submeraed denitrification reactor comprising media particles ranging in size from about 9 mm to 45 mm in diameter; and
   one or more deep bed denitrification filters for removal of suspended solids and denitrification of oxidized nitrogens, the deep bed denitrification filter in fluid communication with the submerged aerated filter.

2. The biologically active reactor system of claim 1 wherein the media bed of the deep bed denitrification unit comprises fine media particles.

3. The biologically active reactor system of claim 2 wherein the size of the fine media particles comprises less than 6 mm.

4. The biologically active reactor system of claim 2 wherein the media bed comprises relatively uniform particles.

5. The biologically active reactor system of claim 1 further comprising a pre-treatment unit for receiving wastewater influent.

6. The biologically active reactor system of claim 5 further comprising piping from the deep bed denitrification filter back to the pretreatment unit to recycle dirty backwash from the deep bed denitrification filter to the wastewater influent entering the pre-treatment unit.

7. The biologically active reactor system of claim 5 further comprising piping from the submerged aerated filter to the wastewater influent entering the pre-treatment unit.

8. The biologically active reactor system of claim 1 further comprising piping from the submerged aerated filter back to the submerged denitrification reactor to recycle a portion of the wastewater effluent from the submerged aerated filter back to the submerged denitrification reactor.

9. The biologically active reactor system of claim 1 further comprising one or more clarification units positioned between the submerged aeration filter and the deep bed denitrification filter to reduce suspended solids in the wastewater effluent from the submerged aerated filter to the deep bed denitrification filter.

10. The biologically active reactor system of claim 9 further comprising piping between the one or more clarification units and the one or more submerged denitrification reactors for recycling the clarified effluent to the submerged denitrification reactor.

11. The biologically active reactor system of claim 9 further comprising one or more pre-treatment units and piping between clarification unit and the pre-treatment unit for recycling clarified effluent between the clarification unit and the pre-treatment unit.

12. The biologically active reactor system of claim 1 wherein the one or more deep bed denitrification filters comprise down flow filters.

13. The biologically active reactor system of claim 1 wherein the submerged denitrification reactor is an up flow filter.

14. The biologically active reactor system of claim 1 wherein the submerged denitrification reactor is a down flow filter.

15. The biologically active reactor system of claim 1 wherein the biologically active microorganisms comprise heterotrophic bacteria and autotrophic bacteria.

16. A method for submerged denitrification filtration comprising:
   feeding a submerged denitrification reactor with wastewater influent, the reactor comprising one or more upright walls defining at least one compartment and a floor, the compartment comprising coarse, mineral media particles and a fixed biological film comprising biologically anoxic active microorganisms;
   piping the effluent wastewater stream from the submerged denitrification reactor unit to a submerged aerated filter;
   piping the remaining effluent from the submerged aerated filter to a deep bed denitrification filter for removal of suspended solids and denitrification: and
   piping a portion of wastewater effluent from the submerged aerated filter to the wastewater influent entering a pre-treatment unit.

17. The method of claim 16 further comprising recycling a portion of the effluent stream from the submerged aerated filter back to the submerged denitrification reactor.

18. The method of claim 16 wherein the wastewater influent is pre-treated in a pretreatment unit prior to being piped to the submerged denitrification reactor.

19. The method of claim 18 wherein dirty backwash water from the deep bed denitrification filter is recycled to the pretreatment unit.

20. The method of claim 18 wherein effluent from the submerged aerated filter is recycled to the pretreatment unit.

21. The method of claim 16 further comprising the step of piping the effluent from the submerged aerated filter to a clarification unit prior to sending the effluent to the deep bed denitrification filter to reduce suspended solids within the effluent.

22. The method of claim 21 wherein a portion of the effluent stream from the clarification unit is recycled to the submerged denitrification reactor.

23. The method of claim 21 wherein a portion of the effluent stream from the clarification unit is recycled to the pre-treatment unit.

24. The method of claim 16 wherein the submerged denitrification reactor is an up flow filter.

25. The method of claim 16 wherein the submerged denitrification reactor is a down flow filter.

26. The method of claim 16 wherein the media beds of the submerged denitrification reactor and the submerged aerated filter comprises media particles ranging in size from about 9 mm to 45 mm in diameter.

27. The method of claim 16 wherein the media bed of the deep bed denitrification filter comprises media having a size of less than 6 mm in diameter.

28. The method of claim 16 wherein the submerged aerated filter comprises aerobic microorganisms to oxidize organic matter comprising carbonaceous organics, organic and ammonium nitrogens to produce $NO_x$, $CO_2$ and $H_2O$.

29. The method of claim 16 wherein the submerged denitrification reactor utilizes BOD within the wastewater influent as an organic carbon source for the anoxic microorganisms to denitrify the $NO_x$.

30. A biologically active reactor system for the treatment of wastewater, the system comprising:
   one or more submerged denitrification reactors, the reactors comprising upright walls defining at least one compartment and a floor, the compartment comprising a media bed, the media bed comprising coarse, media particles ranging in size from about 6 mm to about 45 mm and a fixed biological film comprising biologically anoxic active microorganisms;
   one or more submerged aerated filters in fluid communication with the one or more submerged denitrification reactor, the submerged aerated filter comprising a media bed, the media bed comprising coarse, media particles ranging in size from about 6 mm to about 45 mm and a fixed biological film comprising biologically aerobic microorganisms for oxidation of organic matter; and
   one or more deep bed denitrification filters for removal of suspended solids and denitrification of oxidized nitrogens, the deep bed denitrification filter in fluid communication with the one or more submerged aerated filters, the deep bed denitrification filter comprising fine media particles of less than 6 mm;
   a pre-treatment unit for receiving wastewater influent prior to piping to the submerged denitrification reactor;
   piping from the deep bed denitrification filter back to the pretreatment unit to recycle dirty backwash from the deep bed denitrification filter to the wastewater influent entering the pre-treatment unit;

piping from the submerged aerated filter to the wastewater influent entering the pre-treatment unit;

piping from the submerged aerated filter back to the submerged denitrification reactor to recycle a portion of the wastewater effluent from the submerged aerated filter back to the submerged denitrification reactor;

one or more clarification units positioned between the submerged aeration filter and the deep bed denitrification filter to reduce suspended solids in the wastewater effluent from the submerged aerated filter to the deep bed denitrification filter; and piping between the one or more clarification units and the one or more submerged denitrification reactors for recycling the clarified effluent to the submerged denitrification reactor.

31. A biologically active reactor system for the treatment of wastewater, the system comprising:

one or more submerged denitrification reactors, the reactors comprising upright walls defining at least one compartment and a floor, the compartment comprising a media bed, the media bed comprising coarse, uniformly sized mineral media particles and a fixed biological film comprising biologically anoxic active microorganisms;

one or more submerged aerated filters comprising biologically aerobic microorganisms for oxidation of organic matter in fluid communication with the submerged denitrification reactor;

the media bed of the submerged aerated filter comprising media particles ranging in size from about 9 mm to 45 mm in diameter; and one or more deep bed denitrification filters for removal of suspended solids and denitrification of oxidized nitrogens, the deep bed denitrification filter in fluid communication with the submerged aerated filter.

* * * * *